United States Patent
Rick et al.

(10) Patent No.: US 7,444,150 B2
(45) Date of Patent: Oct. 28, 2008

(54) CELL RESELECTION WITH POWER SCAN AND PARALLEL DECODING

(75) Inventors: Roland Rick, San Diego, CA (US); Rodger Constandse, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 10/682,150

(22) Filed: Oct. 8, 2003

(65) Prior Publication Data

US 2005/0079870 A1  Apr. 14, 2005

(51) Int. Cl.
*H04Q 7/20* (2006.01)

(52) U.S. Cl. .................. 455/436; 455/434; 455/432.1; 455/435.1; 455/435.5; 455/513

(58) Field of Classification Search .............. 455/434, 455/432.1, 435.1, 435.3, 513, 512, 436, 161.3, 455/161.1
See application file for complete search history.

(56) References Cited

U.S. PATENT DOCUMENTS

| | | | | |
|---|---|---|---|---|
| 5,524,280 | A * | 6/1996 | Douthitt et al. ............... 455/62 |
| 6,195,342 | B1 * | 2/2001 | Rohani ...................... 370/331 |
| 6,223,037 | B1 | 4/2001 | Parkkila |
| 6,327,469 | B1 * | 12/2001 | Gaastra ...................... 455/436 |
| 6,377,803 | B1 | 4/2002 | Ruohonen ................... 455/434 |
| 6,389,285 | B1 * | 5/2002 | Escamilla et al. ........... 455/438 |
| 6,771,960 | B1 * | 8/2004 | Otting et al. ................ 455/434 |
| 6,850,744 | B2 * | 2/2005 | Moore ...................... 455/165.1 |
| 2001/0016504 | A1 * | 8/2001 | Dam et al. .................. 455/562 |
| 2001/0046861 | A1 * | 11/2001 | Attimont et al. ............ 455/434 |
| 2002/0111166 | A1 | 8/2002 | Monroe ...................... 455/434 |
| 2003/0040311 | A1 * | 2/2003 | Choi .......................... 455/434 |
| 2003/0078043 | A1 * | 4/2003 | Horwath et al. ............ 455/436 |

OTHER PUBLICATIONS

ESTI TS 100 930 (Digital cellular telecommunications system Phase 2+), Functions related to mobile station in idle and group receive mode, 3GPP 03.22 version 8.7.0 Release 1999.*
Digital Cellular Telecommunications System (Phase 2+); Radio Subsystem Link Control (Jun. 2003) ETSI TS 100 911 V8.17.0 pp. 1-89.

(Continued)

*Primary Examiner*—Charles N Appiah
*Assistant Examiner*—Kwasi Karikari
(74) *Attorney, Agent, or Firm*—Thomas R. Rouse; Howard Seo; Darren M. Simon

(57) ABSTRACT

Upon power on, a terminal performs cell selection, finds the most suitable cell to receive communication service, and camps on this cell (the serving cell). The terminal thereafter performs "C2-based" cell reselection if a better cell is found, "non-C2 based" cell reselection if the current serving cell cannot be camped on, "power scan" cell reselection if the C2-based or non-C2 based cell reselection fails, and cell selection if the power scan cell reselection fails. For the power scan cell reselection, the terminal initially performs a power scan and obtains received signal strength measurements for a list of RF channels. This list includes fewer than all RF channels evaluated by the cell selection. The terminal then acquires and decodes the N strongest RF channels, preferably in parallel, to find a suitable cell. The terminal selects a suitable cell, if found, with the highest C2 value as the new serving cell from which to receive service.

30 Claims, 10 Drawing Sheets

OTHER PUBLICATIONS

Digital Cellular Telecommunications System (Phase 2+); Functions Related to Mobile Stations (MS) in Idle Mode and Group Receive Mode (Sep. 2002) ETSTI TS 100 930 V8.17.0 pp. 1-22.

Annex B (Informative): Power Control Procedures (Jun. 2003) ETSI TS 100 911 V8.17.0 pp. 90-102.

International Search Report, PCT/US04/030965 - International Search Authority - European Patent office - Jan. 24, 2005.

* cited by examiner

US 7,444,150 B2

CELL RESELECTION WITH POWER SCAN AND PARALLEL DECODING

BACKGROUND

I. Field

The present invention relates generally to communication, and more specifically to techniques for performing cell reselection in a wireless communication system.

II. Background

In a Global System for Mobile Communications (GSM) system, a terminal that is just powered on or has just lost coverage searches for suitable cells from which the terminal can receive communication service. A "cell" can refer to a base station in the system and/or the coverage area of the base station, depending on the context in which the term is used. A "suitable" cell is one that the terminal can receive service on. GSM defines a set of criteria that a cell must meet in order to be deemed a suitable cell. If a suitable cell is found, then the terminal performs registration with the cell, if necessary. The terminal then "camps" on the cell if the terminal is in an idle mode and not actively communicating with the cell. While camped on the cell, the terminal performs tasks as specified by GSM so that the terminal can (1) receive system information from the cell, (2) receive paging messages from the cell (e.g., alerting the terminal to incoming calls), and (3) initiate call setup for outgoing calls or other actions. The cell on which the terminal is camped is referred to as the "serving" cell.

While camped on the cell, the terminal periodically checks to see if there is a better cell that the terminal can camp on and receive service (e.g., another cell with a higher received signal level). If such a cell exists, then the terminal selects this cell as the new serving cell via a process commonly referred to as "cell reselection." The terminal may also be required to immediately perform cell reselection to another cell under certain scenarios. For example, the terminal is required to immediately perform cell reselection if the current serving cell becomes barred, if the terminal cannot receive the signal from the current serving cell because the channel condition has degraded, and so on. In any case, the terminal performs cell reselection while in the idle mode so that it can monitor the system for incoming paging messages and initiate a call even if the channel condition changes (e.g., if the terminal moves to a new location).

For cell reselection where the initial reselection fails or there is no information on neighbor cells, the terminal may need to obtain received signal strength measurements and need to gather pertinent system information for new cells, both of which typically require a long period of time to perform. During the time that the terminal is performing these tasks, it is not able to receive service from the system and would also miss any paging messages sent to it, both of which are highly undesirable.

There is therefore a need in the art for techniques to expediently gather information about neighbor cells during cell reselection in order to reduce both down time and the likelihood of missing paging messages.

SUMMARY

Techniques for performing cell reselection with power scan and/or parallel decoding are provided herein. These techniques may reduce down time and provide improved performance. Upon power on, a terminal performs cell selection to find the most suitable cell that the terminal can camp on and receive communication service. The terminal selects this most suitable cell as the serving cell and camps on this cell if the terminal is in idle mode. The terminal may thereafter perform cell reselection to select another suitable cell to receive service. Cell reselection may be required for any number of reasons such as, for example, if a better cell is found, if the terminal can no longer camp on the current serving cell, and so on. The terminal performs "C2-based" cell reselection if a better cell is found and "non-C2 based" cell reselection for any other reason. In an embodiment, the terminal performs "power scan" cell reselection if the C2-based or non-C2 based cell reselection fails. In other embodiments, the power scan cell reselection may be triggered by some other events or conditions.

In one embodiment of the power scan cell reselection, the terminal initially performs a power scan on a first list of RF channels to obtain received signal strength measurements for these RF channels. The first list may include different RF channels depending on the event that triggers the power scan cell reselection. In all cases, the first list includes fewer than all of the RF channels evaluated by the cell selection. The terminal obtains a second list of at least one RF channel based on the results of the power scan. For example, the second list may include the N strongest RF channels in the first list, where $N \geq 1$. The terminal processes (e.g., acquires and decodes) at least one RF channel in the second list to find the suitable cell. If $N > 1$, then the RF channels in the second list may be processed in parallel, as described below, to speed up the power scan cell reselection. The terminal selects the most suitable cell, if found, as the new serving cell from which to receive service. The terminal may perform cell selection if the power scan cell reselection fails.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
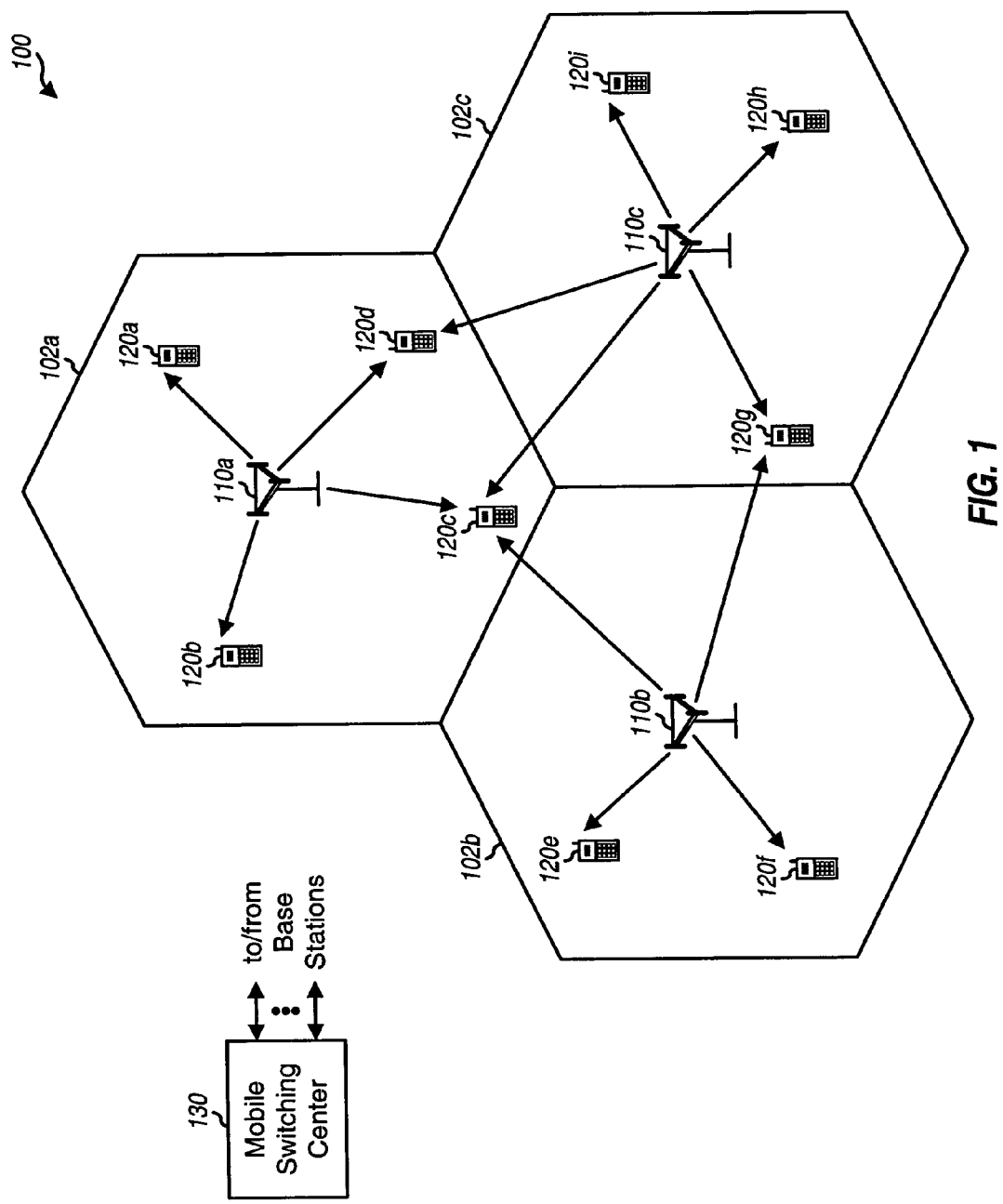
FIG. 1 shows a wireless communication system.

FIG. 1 shows a wireless communication system 100 with a number of base stations 110 that provide communication service for a number of terminals 120. A base station is a fixed station and may also be referred to as a base transceiver station (BTS), a Node B, an access point, or some other terminology. Terminals 120 are typically dispersed throughout the system. A terminal may be fixed or mobile and may also be referred to as a mobile station (MS), a mobile equipment (ME), a user equipment (UE), a wireless communication device, or some other terminology. A mobile switching center (MSC) 130 provides coordination and control for base stations 110 and further controls the routing of data to/from the terminals served by these base stations. An MSC may also be referred to as a radio network controller (RNC) or some other terminology.

System 100 may be a Time Division Multiple Access (TDMA) system that may implement one or more TDMA standards such as GSM. System 100 may also be a Code Division Multiple Access (CDMA) system that may implement one or more CDMA standards such as Wideband CDMA (W-CDMA), IS-2000, IS-856, IS-95, and so on. These standards are well known in the art.

The techniques described herein for performing cell reselection with power scan and/or parallel decoding may be used for various wireless communication systems. For clarity, these techniques are specifically described for a GSM system.

Figure 2:
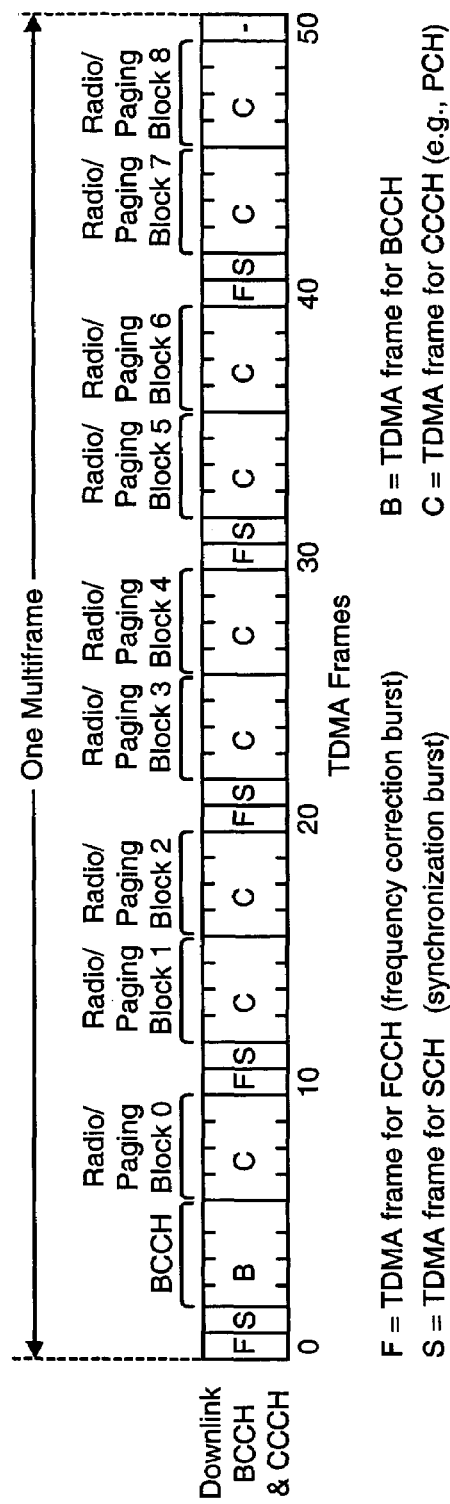
FIG. 2 shows a channel configuration for the control channels in GSM.

FIG. 2 shows a channel configuration for the control channels in GSM. The timeline for data transmission is divided into multiframes. For the control channels, each multiframe has a duration of 235.365 msec and is partitioned into 51 TDMA frames, which are labeled as TDMA frames 0 through 50. Although not shown in FIG. 2, each TDMA frame is further partitioned into 8 time slots, which are labeled as time slots 0 through 7. Time slot 0 is used for the control channels and times slots 1 through 7 are used for traffic channels. The data transmission in each time slot is referred to as a "burst". In GSM, the cells are not synchronized and the timing of each cell is unlikely to be aligned with the timing of other cells. The multiframes of each cell may thus start at any arbitrary point in time.

The control channels for GSM include a frequency correction channel (FCCH), a synchronization channel (SCH), a broadcast control channel (BCCH), and a common control channel (CCCH). The FCCH allows a terminal to set its frequency and coarse timing, and is sent in TDMA frames 0, 10, 20, 30 and 40 of each multiframe. The SCH carries (1) a reduced TDMA frame number (RFN) used by a terminal to synchronize its timing and frame numbering and (2) a base transceiver station identity code (BSIC) used to identify the transmitting base station. The SCH is sent in TDMA frames 1, 11, 21, 31 and 41 of each multiframe. The BCCH carries system information and is sent in TDMA frames 2, 3, 4 and 5 of each multiframe. The CCCH carries control information and is also used to implement a paging channel (PCH). The PCH carries paging messages, e.g., to alert idle mode terminals of incoming calls. The CCCH includes nine radio blocks in each multiframe, and some or all of the CCCH radio blocks may be used for the PCH. A CCCH radio block used for the PCH is referred to as a "paging block". Each idle mode terminal is assigned to a specific paging group, which is determined based on the terminal's International Mobile Subscriber Identity (IMSI) and the number of paging blocks available in one CCCH. Each paging group includes one paging block sent in the m-th CCCH radio block of every n-th multiframe, where $8 \geq m > 0$ and $9 \geq n \geq 2$.

FIG. 2 shows one of multiple channel configurations for the control channels. Other possible combinations of control channels for the 51-frame multiframe exist. Moreover, time slots other than time slot 0 can carry the control channels. However, the specific channel combination shown in FIG. 2 is only found in time slot 0. The channel configurations for the control channels in GSM are described in detail in a document 3GPP TS 05.01, which is publicly available.

A terminal may be designed to operate in one or more frequency bands. Each frequency band covers a specific range of frequencies and is divided into a number of 200 kHz RF channels. Each RF channel is identified by a specific ARFCN (absolute radio frequency channel number). For example, the GSM 900 frequency band includes ARFCNs 1 through 124, the GSM 1800 frequency band includes ARFCNs 512 through 885, and the GSM 1900 frequency band includes ARFCNs 512 through 810.

Each cell transmits data and signaling via a set of RF channels that is assigned to the cell by a network operator. To reduce inter-cell interference, cells located near each other are assigned different sets of RF channels such that the transmissions from the cells do not interfere with one another. Each cell may broadcast system information on one or more of the RF channels assigned to the cell. An RF channel used to broadcast system information is referred to as a BCCH carrier. If a terminal does not know which RF channels are BCCH carriers, then the terminal may need to acquire and evaluate all of the RF channels to determine whether or not the RF channel is a BCCH carrier for a cell.

Each cell broadcasts a BCCH allocation (BA) list that includes up to 32 ARFCNs for the BCCH carriers of up to 32 cells, one ARFCN/BCCH carrier for each cell. The BA lists broadcast by cells located near each other may include many of the same ARFCNs, although these lists are typically not identical. A terminal obtains the BA list from its serving cell and performs measurements for the cells included in the BA list, as specified by GSM and described below.

In GSM, each cell broadcasts full system information in pieces on the BCCH using different types of system information messages. Each system information message carries certain system information and is broadcast at designated times. A System Information Type 3 message ("SI3") carries information needed by a terminal to perform cell reselection and receive paging messages from a cell. A System Information Type 4 message ("SI4") carries information needed by a terminal to perform cell reselection but does not contain information needed to receive paging messages. Full system information is broadcast in system information messages of types 1 through 20, which are not consecutively numbered. A terminal is not permitted to camp on the cell and transmit on the uplink to a cell until the terminal has gathered the full system information from the cell.

Figure 3:
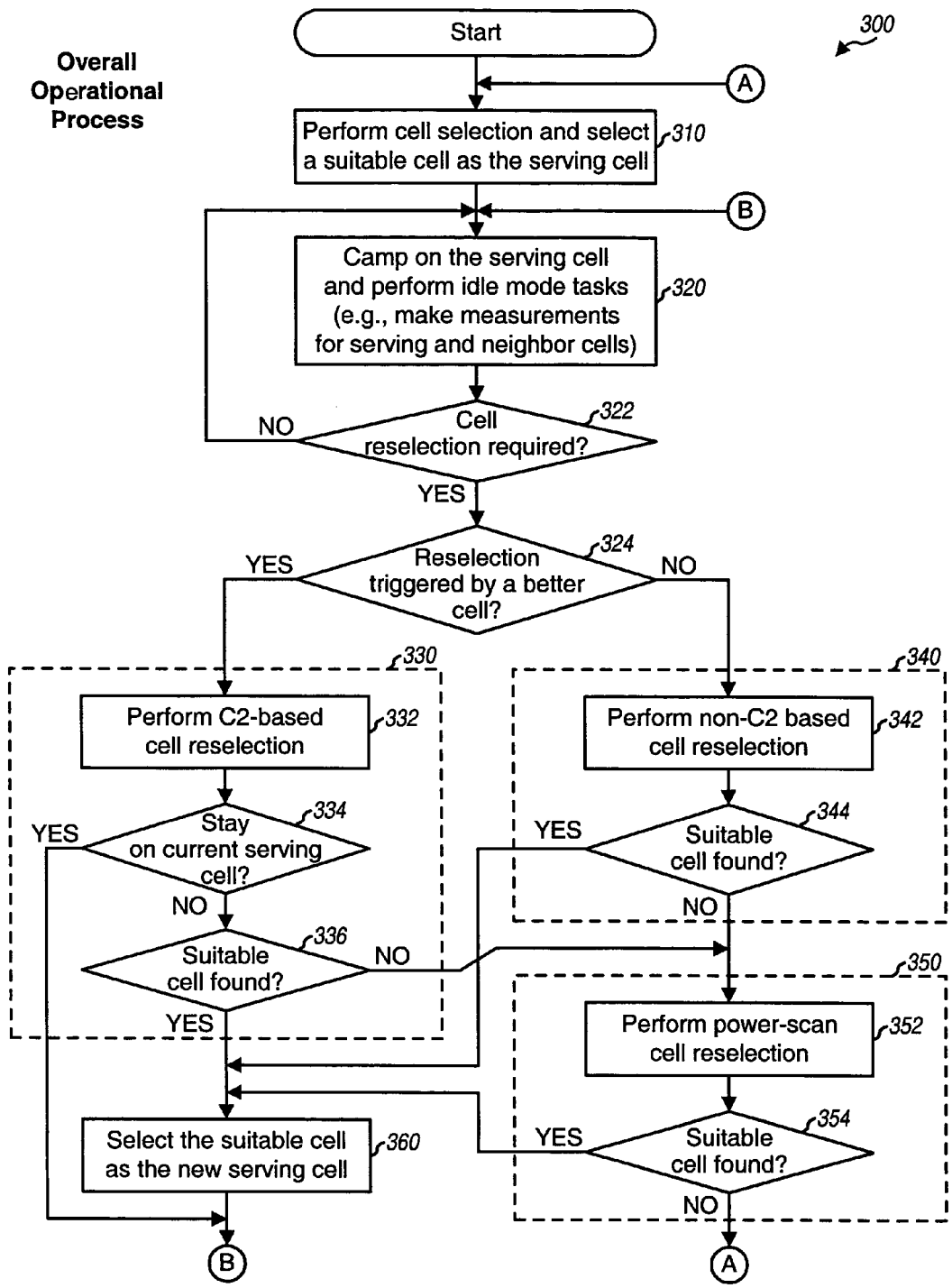
FIG. 3 shows an overall operational process for a terminal in a GSM system.

FIG. 3 shows a flow diagram of an overall process 300 for the operation of a terminal in a GSM system. When powered on, the terminal performs cell selection and searches for suitable cells from which it may receive communication service (step 310). For GSM, a cell is deemed suitable if the following criteria are met:

The cell is located in a selected or equivalent public land mobile network (PLMN);

The cell is not barred by the network operator;

The cell is not in a location area (LA) that is forbidden;

The radio path loss between the terminal and the cell is lower than a specified threshold; and The cell is not an SoLSA exclusive cell that the terminal does not subscribe to. An SoLSA (support of localized service area) exclusive cell is a cell on which camping is allowed only for a terminal that has a localized service area (LSA) subscription. The cell suitability criteria are specified by GSM in a document 3GPP TS 03.22, Section 3.2, which is publicly available. The terminal selects the most suitable cell (e.g., the suitable cell with the strongest received signal strength) as the serving cell and performs registration with the cell if necessary (also in step 310). Cell selection is described in further detail below.

If the terminal is in the idle mode, then it camps on the serving cell and performs idle mode tasks (step 320). These tasks include:

Measure the received signal level of the serving cell at least every paging block;

Decode the BCCH of the serving cell at least every 30 seconds to obtain full system information;

Measure the received signal level of the non-serving cells in the BA list (i.e., the "neighbor cells");

Decode the SCH of the six strongest non-serving cells at least every 30 seconds to obtain the BSIC to confirm that the same cell is being monitored; and Decode the BCCH of the six strongest non-serving cells at least every 5 minutes to obtain system information affecting cell reselection (SI3 or SI4).

The idle mode tasks in GSM are described in a document 3GPP TS 05.08, Section 6.6.1, which is publicly available. The terminal typically makes the received signal strength measurements for the serving and neighbor cells during its paging blocks or shortly thereafter. The measurements and system information are used to determine whether there is a better cell that the terminal can camp on and receive service and to select another serving cell if the terminal cannot remain camped on the current serving cell.

A determination is periodically made whether or not cell reselection needs to be performed (step 322). The terminal performs cell reselection to select a new serving cell if any one of the following events occurs:

The path loss to the current serving cell has become too high;

There is a downlink signaling failure;

The current serving cell has become barred;

There is a better cell in the same registration area or a much better cell in another registration area with the same PLMN or an equivalent PLMN;

The terminal is unable to transmit to the network; or

The network has failed an authentication check.

The path loss to a cell is determined based on a path loss criterion parameter C1, which is a function of the received signal strength measurements and other parameters for the cell. The path loss is too high if the C1 value is less than zero for at least five seconds.

The determination of a better cell is made based on a path loss criterion parameter C2, which is a function of C1 and other parameters. A cell is deemed to be better than the current serving cell if the C2 value for that cell is higher than the C2 value for the current serving cell for at least five seconds.

Downlink signaling failure is a common event in the field and is determined based on a downlink signaling failure counter (DSC). The DSC is initialized to a start value when the terminal first camps on a cell. Thereafter, the DSC is incremented by one whenever a paging message from the cell is decoded correctly (but limited to the start value) and decremented by four whenever a paging message is decoded in error. Downlink signaling failure is declared when the DSC reaches zero or below.

A cell may be barred to not allow terminals to camp on the cell. Whether or not a given cell is barred is indicated by the system information broadcasted by that cell. Since the barred cell status may change dynamically, the terminal periodically checks this information for the serving cell and acts accordingly.

The terminal is deemed to be unable to communicate with the network if a specified maximum number of random access attempts made by the terminal to access the network are unsuccessful (i.e., not acknowledged).

The events triggering cell reselection are described in the document 3GPP TS 03.22, Section 4.5. If cell reselection is not required (as determined in step 322), then the terminal returns to step 320 and continues to camp on the current serving cell. If cell reselection is required, then a determination is made whether the cell reselection is triggered by a better cell being found (step 324).

If a better cell was found (i.e., the answer is 'yes' for step 324), then the terminal performs "C2-based" cell reselection, as described below (step 332). Cell reselection to a better cell is referred to as C2-based cell reselection because the better cell is determined based on the C2 values for the better cell and the current serving cell. If it is determined that the terminal should stay on the current serving cell (step 334), then the terminal returns to step 320 and continues to camp on this cell. Otherwise, if a better cell is found to be suitable (as determined in step 336), then the terminal selects this better cell as the new serving cell (step 360) and thereafter camps on this cell (step 320). If a suitable cell was not found (as determined in step 336), then the terminal performs "power scan" cell reselection, as also described below (step 352).

If cell reselection is triggered by an event other than a better cell being found (i.e., the answer is 'no' for step 324), then the terminal performs "non-C2 based" cell reselection, as also described below (step 342). GSM requires non-C2 based cell reselection to be performed immediately because the terminal cannot receive service from the current serving cell and needs to reselect to another cell to receive service. If a suitable cell is found by the non-C2 based cell reselection (as determined in step 344), then the terminal selects this suitable cell as the new serving cell (step 360) and thereafter camps on this cell (step 320). If a suitable cell was not found (as determined in step 344), then the terminal performs power scan cell reselection (step 352).

In an embodiment, the terminal performs power scan cell reselection (step 352) if a suitable cell was not found by the C2-based cell reselection in step 332 or by the non-C2 based cell reselection in step 342. If a suitable cell is found by the power scan cell reselection (as determined in step 354), then the terminal selects this suitable cell as the new serving cell (step 360) and thereafter camps on this cell (step 320). If a suitable cell is not found (as determined in step 354), then the terminal returns to step 310 and performs cell selection.

Cell selection, C2-based cell reselection, non-C2 based cell reselection, and power scan cell reselection are described in further detail below.

Figure 4:
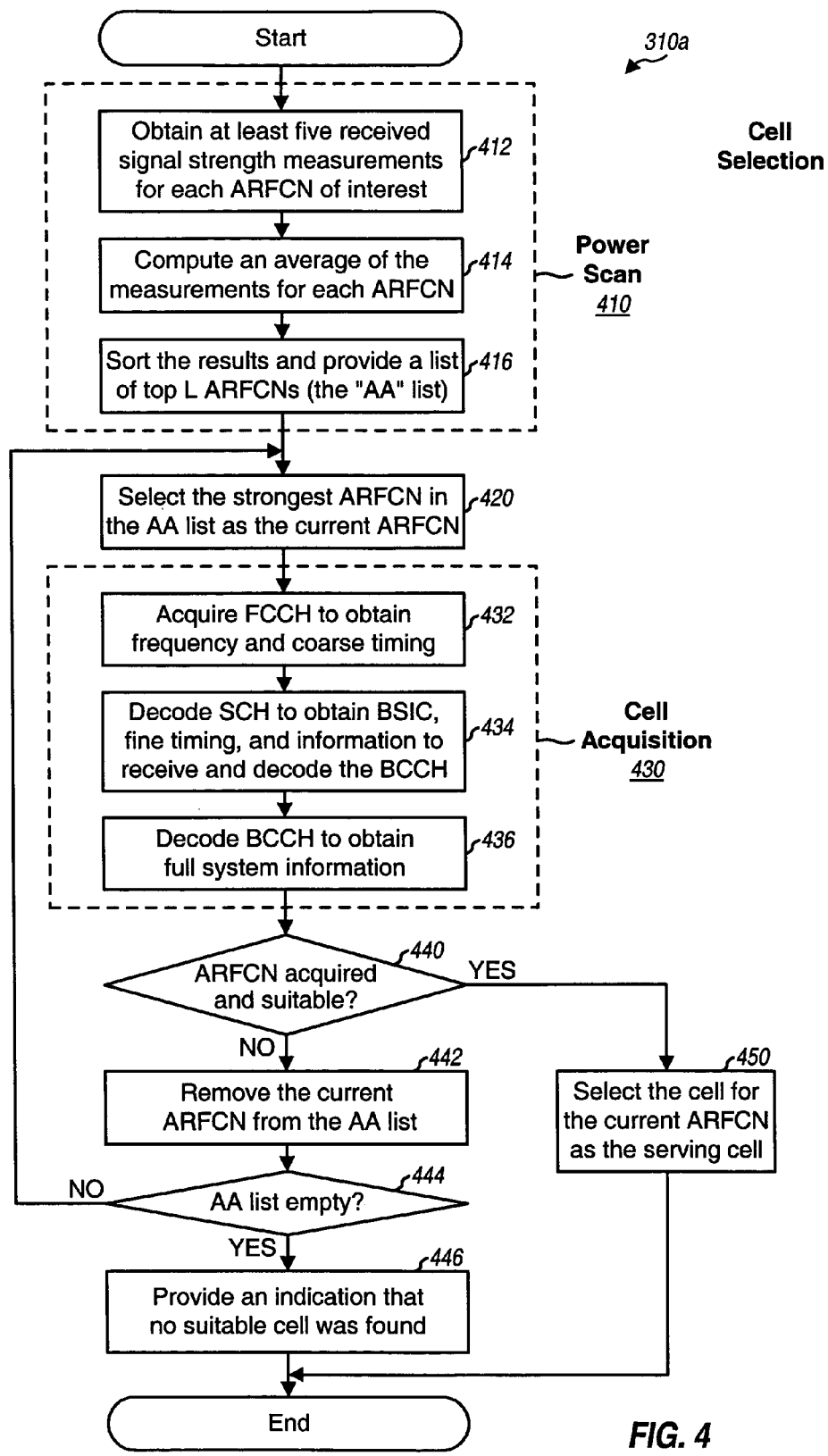
FIG. 4 shows a cell selection process.

FIG. 4 shows a flow diagram of a cell selection process 310*a*, which may be used for step 310 in FIG. 3. For "normal" cell selection whereby the terminal has no prior knowledge of which RF channels are BCCH carriers, the terminal performs a "power scan" to obtain received signal strength measurements for all RF channels of interest (block 410). The number of ARFCNs to scan is dependent on the specific frequency band(s) supported by the terminal. For the power scan, the terminal obtains at least five received signal strength measurements spread over three to five seconds for each of the ARFCNs (step 412). These received signal strength measurements are also referred to as monitors, power measurements, and received signal level measurements. The terminal then computes an average of the measurements obtained for each ARFCN (step 414). The average for a given ARFCN is referred to as "RLA_C" in GSM. The terminal then sorts the RLA_C values for all of the ARFCNs. In the embodiment shown in FIG. 4, the terminal provides a list of the L strongest ARFCNs, sorted in descending order based on their RLA_C values, which is referred to as the "AA" list (step 416).

The terminal then attempts acquisition of the ARFCNs in the AA list, one ARFCN at a time, to find the most suitable cell to camp on. The terminal selects the strongest ARFCN in the AA list as the current ARFCN (step 420). The terminal then performs cell acquisition and attempts to acquire the current ARFCN (block 430). For the cell acquisition, the terminal first acquires the FCCH for the current ARFCN to obtain frequency and coarse timing for this ARFCN (step 432). The terminal then decodes the SCH for the current ARFCN to obtain the BSIC and fine timing for this ARFCN and information needed to acquire the BCCH (step 434). The terminal then decodes the BCCH for the current ARFCN to obtain SI3 or SI4 (step 436). This information includes the PLMN of the current ARFCN and parameters used to verify suitability of the cell for the current ARFCN (i.e., whether or not the cell can be camped on by the terminal).

Based on all of the information obtained in block 430, a determination is made whether or not the cell for the current ARFCN is acquired and suitable (step 440). If the answer is 'yes', then the terminal selects the cell for the current ARFCN as the serving cell and decodes the BCCH for this cell to gather full system information (step 450). Since the ARFCNs are sequentially evaluated and in descending order based on their RLA_C values, the first suitable cell found is also the most suitable cell. Cell selection process 310a then terminates. Otherwise, if the cell for the current ARFCN is not suitable (i.e., the answer is 'no' for step 440), then the current ARFCN is removed from the AA list (step 442). A determination is next made whether or not the AA list is empty (step 444). If the answer is 'no', then the terminal returns to step 420 to select another ARFCN in the AA list to attempt acquisition. Otherwise, an indication is provided that no suitable cell was found (step 446), and cell selection process 310a then terminates.

Figure 5:
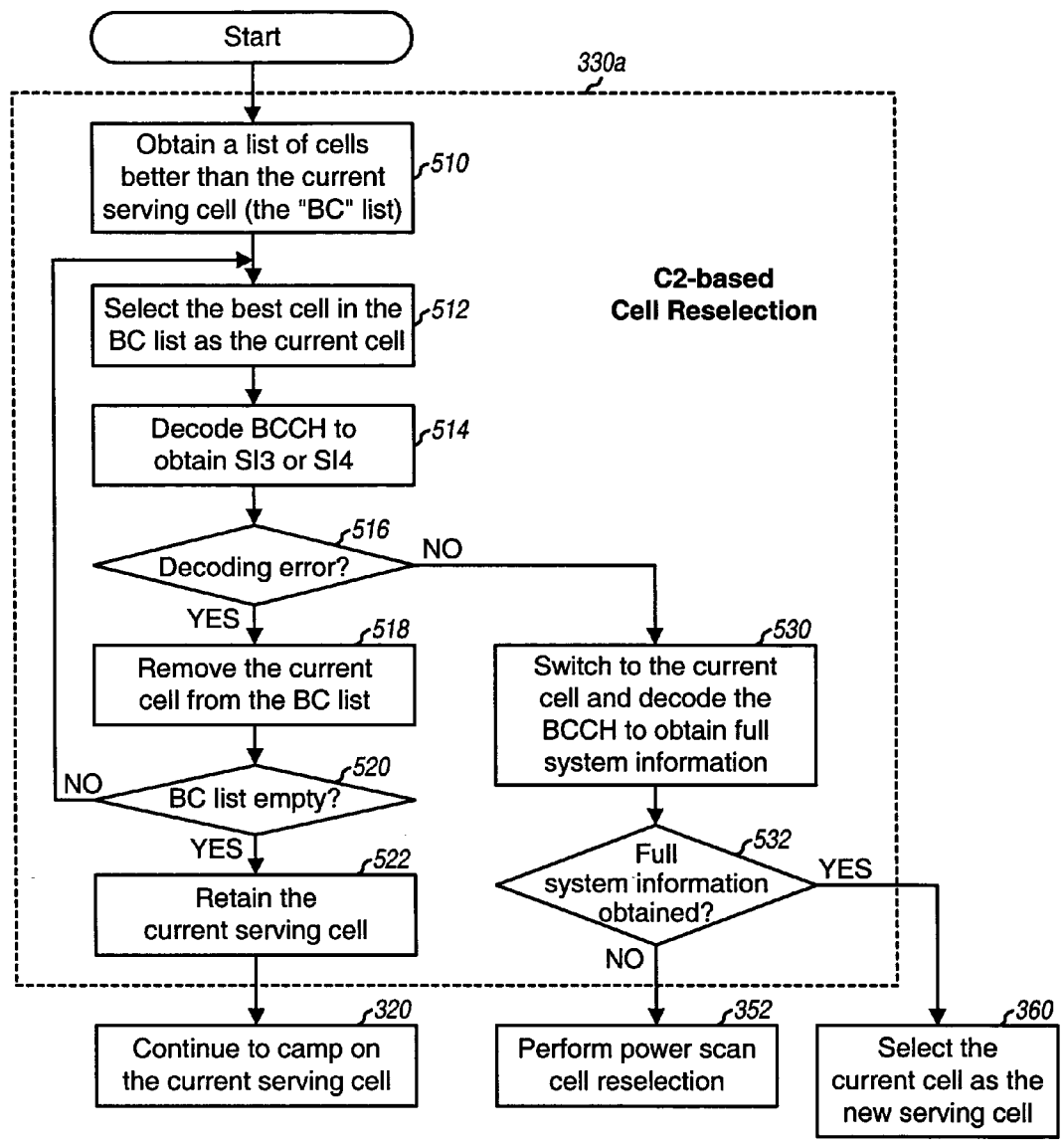
FIG. 5 shows a C2-based cell reselection process.

FIG. 5 shows a flow diagram of a C2-based cell reselection process 330a, which may be used for block 330 in FIG. 3. Initially, the terminal obtains a list of cells that are deemed to be better than the current serving cell, which is referred to as the "BC" list (step 510). A cell is better than the current serving cell if the C2 value for that cell is greater than the C2 value for the current serving cell for at least five seconds. The better cells are among the neighbor cells in the BA list, which are monitored by the terminal while in the idle mode. The BC list may include one or multiple better cells.

For the embodiment shown in FIG. 5, the terminal continues to camp on the current serving cell as foreground tasks and attempts to decode the BCCH of the better cells as background tasks. The terminal can typically perform both foreground and background tasks in a time division multiplexed (TDM) manner. The foreground tasks have higher priority and are performed first, and the background tasks have lower priority and are performed second. The terminal only switches from the current serving cell to a better cell if the BCCH of the better cell can be decoded correctly. By "confirming" before switching, the terminal can continue to receive service from the current serving cell during a portion of the C2-based cell reselection. The confirmation before switching also reduces the likelihood of losing service by prematurely switching to a better cell and not being able to decode this cell.

The terminal attempts acquisition of the better cells in the BC list, one cell at a time. The terminal selects the best cell in the BC list as the current cell (step 512). The terminal decodes the BCCH of the current cell (as background tasks) to obtain SI3 or SI4, which carries information used to verify suitability of the current cell (step 514). If the BCCH of the current cell cannot be decoded (as determined in step 516), then this cell is removed from the BC list (step 518). A determination is then made whether or not the BC list is empty (step 520). If the answer is 'no', then the terminal returns to step 512 and selects another better cell to attempt acquisition. Otherwise, if the BC list is empty, then the terminal retains the current serving cell (step 522) and continues to camp on this cell (step 320 in FIG. 3).

If the BCCH of the current cell is decoded correctly (i.e., the answer is 'no' for step 516), then the terminal switches to the current cell and starts decoding the BCCH of this cell to obtain full system information, which is required in order to camp on and transmit to the cell (step 530). If the full system information is successfully obtained (as determined in step 532), then the terminal selects the current cell as the new serving cell (step 360 in FIG. 3) and thereafter camps on this cell (step 320 in FIG. 3).

If the full system information cannot be obtained for the current cell (as determined in step 532), then the terminal performs power scan cell reselection for a list of cells, which is referred to as the "PS1" list (step 352 in FIG. 3). In an embodiment, the PS1 list includes all of the cells in the BA list, including the old/current serving cell. In another embodiment, the PS1 list includes the six strongest neighbor cells in the BA list. In yet another embodiment, the PS1 list includes all of the cells in the BA list plus additional cells on which the terminal may camp. These additional cells may be cells that the terminal has camped on recently, cells from the BA lists of neighbor cells, and so on. In general, the PS1 list may include any cell that the terminal may possibly camp on.

FIG. 5 shows a specific embodiment of a C2-based cell reselection process. C2-based cell reselection may be performed in other manners. The events that trigger power scan cell reselection may be different than that shown in FIG. 5.

A conventional terminal typically performs cell selection immediately whenever C2-based cell reselection fails and evaluates up all ARFCNs to find a suitable cell. Cell selection may thus take an extended period of time, and the terminal typically cannot receive service during this time. Since power scan cell reselection can be performed in a shorter period of time than cell selection and since power scan cell reselection can find a suitable cell to camp on in many instances, loss of service is reduced and performance is improved by performing power scan cell reselection instead of, and prior to, cell selection as described above for FIGS. 3 and 5.

As noted above, GSM requires cell reselection for any reason other than a better cell to be performed immediately. If valid RLA_C values are not available for the neighbor cells in the BA list, then the terminal is required to wait until these values are available and then performs cell reselection if still required. A valid RLA_C value may not be available for a cell, for example, if the required number of measurements has not been made for the cell. To reduce cell reselection delay due to the wait for valid RLA_C values, GSM permits the terminal to accelerate the idle mode measurement procedure. However, this may complicate the designs of the idle mode and cell reselection procedures may provide marginal improvement.

Figure 6:
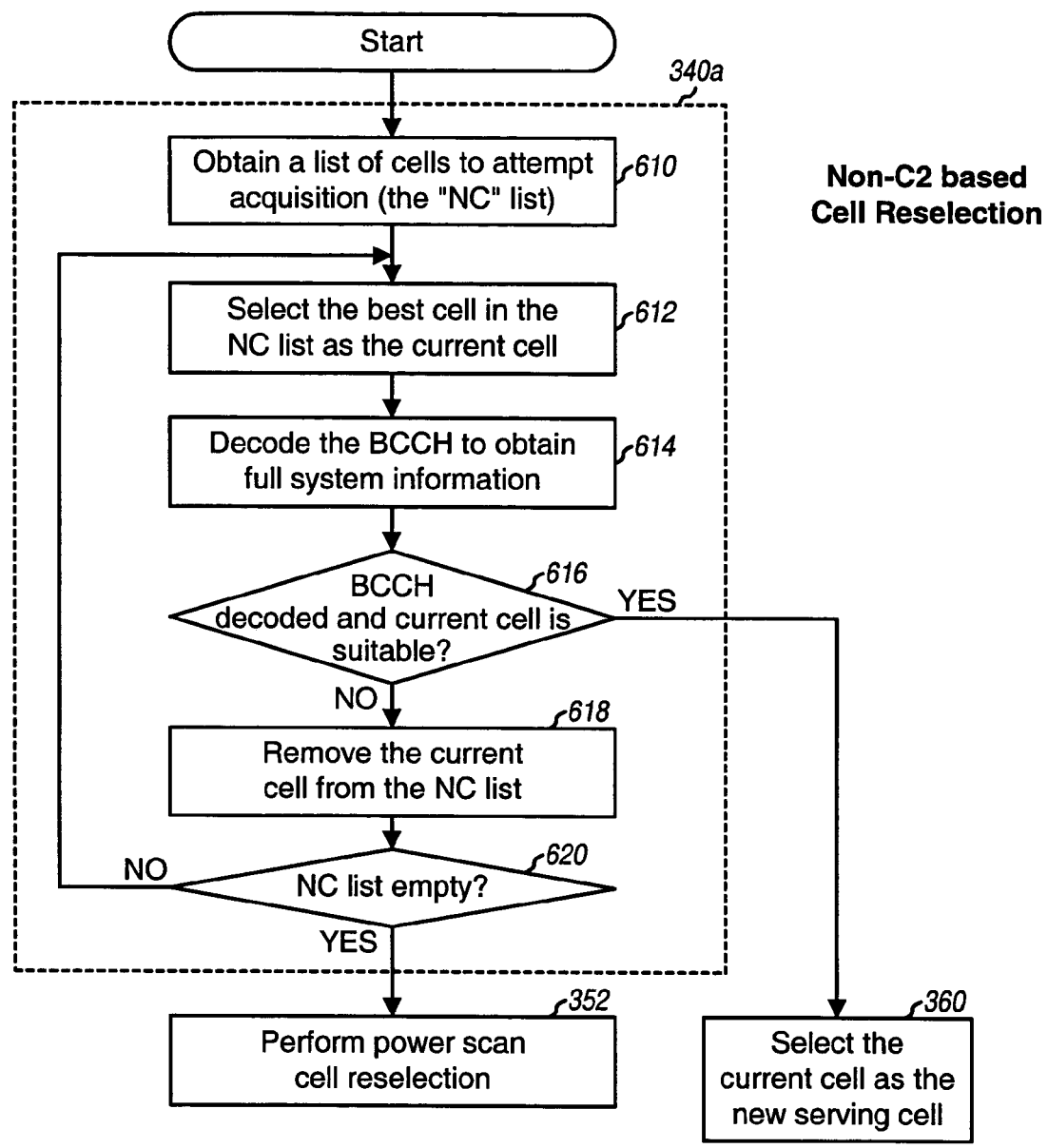
FIG. 6 shows a non-C2 based cell reselection process.

FIG. 6 shows a flow diagram of a non-C2 based cell reselection process 340a, which may be used for block 340 in FIG. 3. Initially, the terminal obtains a list of cells to attempt acquisition, which is referred to as the "NC" list (step 610). In an embodiment, the NC list includes neighbor cells for which the terminal currently has valid RLA_C values. By starting non-C2 based cell reselection immediately for those cells for which valid RLA_C values are currently available, and using power scan cell reselection thereafter for the cells in the BA list, improved cell reselection performance may be obtained.

For the embodiment shown in FIG. 6, the terminal attempts acquisition of the cells in the NC list, one cell at a time. The terminal selects the best cell in the NC list as the current cell (step 612). The terminal decodes the BCCH of the current cell to obtain full system information (step 614). The terminal gathers full system information (instead of SI3 or SI4) in order to find a suitable cell as soon as possible since the terminal cannot obtain service from the current serving cell. If the full system information is successfully obtained and the current cell is deemed to be suitable (as determined in step 616), then the terminal selects the current cell as the new serving cell (step 360 in FIG. 3) and thereafter camps on this cell (step 320 in FIG. 3).

Otherwise, if the full system information cannot be obtained for the current cell or if the cell is deemed to be unsuitable (as determined in step 616), then this cell is removed from the NC list (step 618). A determination is then made whether or not the NC list is empty (step 620). If the answer is 'no', then the terminal returns to step 612 and selects another cell in the NC list to attempt acquisition. Otherwise, if the NC list is empty, then the terminal performs power scan cell reselection for a list of cells, which is referred to as the "PS2" list (step 352 in FIG. 3). In an embodiment, the PS2 list includes all of the cells in the BA list except for the old/current serving cell, which cannot be camped on. In another embodiment, the PS2 list includes the six strongest neighbor cells in the BA list. In yet another embodiment, the PS2 list includes all of the cells in the BA list plus additional cells on which the terminal may camp. In general, the PS2 list may include any cell that the terminal may possibly camp on.

Figure 7:
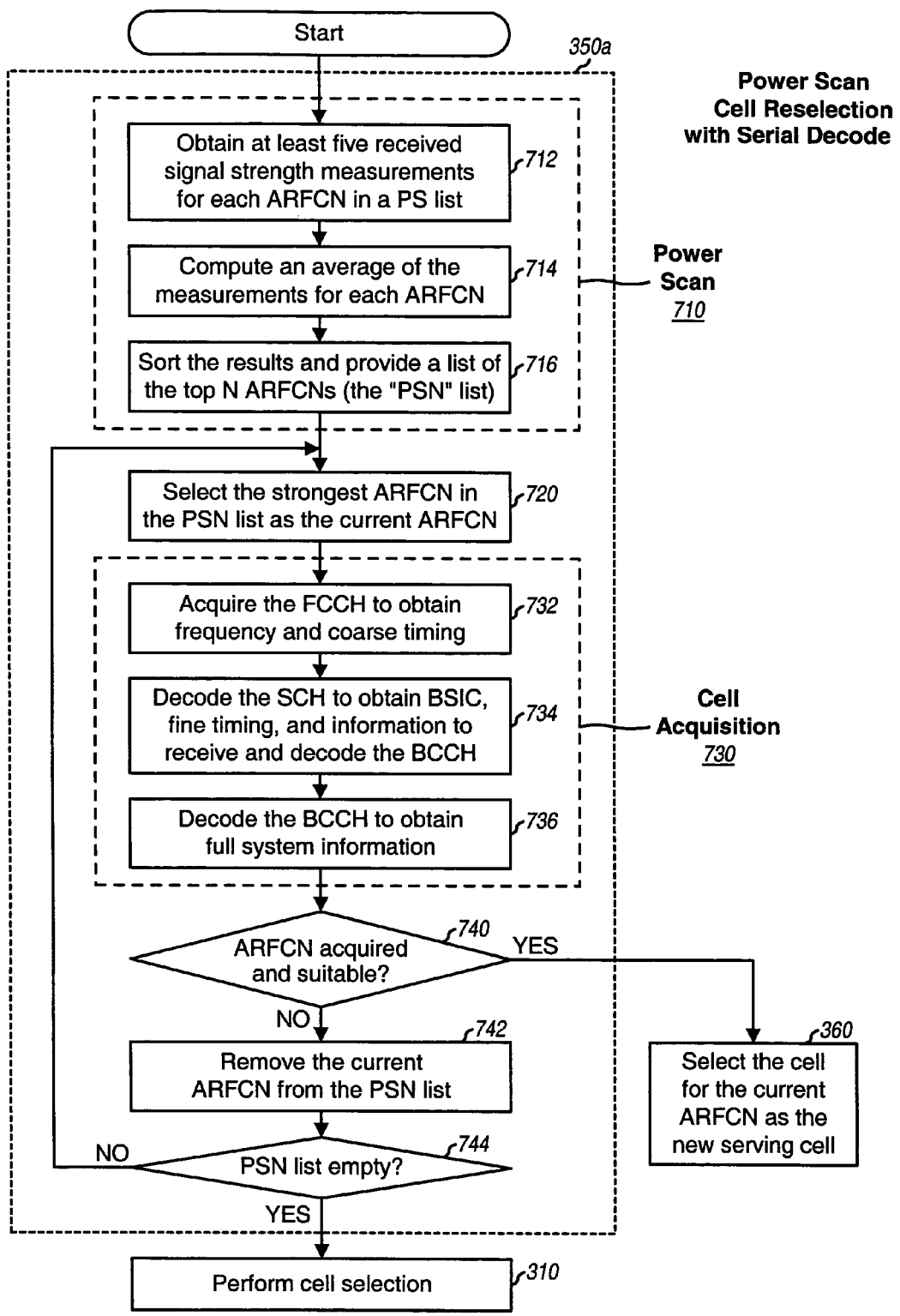
FIG. 7 shows a power scan cell reselection process with serial decoding.

FIG. 7 shows a flow diagram of a power scan cell reselection process 350a with serial decoding. Process 350a may be used for block 350 in FIG. 3. Initially, the terminal obtains a list of cells to attempt power scan cell reselection, which is referred to as the "PS" list. In one embodiment, the PS list may be (1) the PS1 list from the C2-based cell reselection, which may include all of the cells in the BA list including the old/current serving cell, or (2) the PS2 list from the non-C2 based cell reselection, which may include all of the cells in the BA list except the old/current serving cell. For this embodiment, the PS list may include up to 32 ARFCNs for up to 32 cells, which is substantially fewer than the set of ARFCNs for a full power scan for normal cell selection.

For process 350a, the terminal initially performs a power scan to obtain received signal strength measurements for all of the ARFCNs in the PS list (block 710). For the power scan, the terminal obtains at least five measurements spread over three to five seconds for each of the ARFCNs in the PS list (step 712), computes the RLA_C value for each ARFCN based on the measurements (step 714), and sorts the RLA_C values for all ARFCNs in the PS list (step 716). In one embodiment which is shown in FIG. 7, the terminal provides a list of the N strongest ARFCNs after the sorting, which is referred to as the "PSN" list. The value for N may be selected based on various considerations such as, for example, the expected amount of time available for power scan cell reselection. For example, N may be selected to be equal to six, which corresponds to the number of neighbor cells for which the terminal is required by GSM to periodically obtain system information. In another embodiment, the PSN list includes all of the ARFCNs in the PS list. In general, the PSN list may include one, some, or all of the ARFCNs in the PS list.

The power scan in block 710 may be performed relatively quickly (e.g., in approximately five seconds for one exemplary terminal design). For the power scan, the terminal remains awake to make as many measurements as needed. In contrast, in the idle mode, the terminal may sleep between its paging blocks and only wakes up prior to the paging blocks to receive paging messages and make measurements. The terminal may make more measurements in the idle mode by waking up more often or by remaining awake longer, both of which may complicate the design of the idle mode procedure. The cell reselection power scan (block 710) may be conveniently performed by program code and/or processing units used to perform cell selection power scan (block 410 in FIG. 4), albeit with a different list of ARFCNs.

After the power scan, the terminal attempts acquisition of the ARFCNs in the PSN list, one ARFCN at a time, to find the most suitable cell to camp on. The terminal selects the strongest ARFCN in the PSN list as the current ARFCN (step 720). The terminal then attempts acquisition of the current ARFCN (block 730). For cell acquisition, the terminal first acquires the FCCH for the current ARFCN to obtain frequency and coarse timing (step 732), then decodes the SCH to obtain the BSIC, fine timing, and information needed to acquire the BCCH (step 734), and then decodes the BCCH to obtain full system information (step 736).

If the current ARFCN is acquired and deemed to be suitable (as determined in step 740), then the terminal selects the cell for the current ARFCN as the serving cell (step 360 in FIG. 3) and thereafter camps on this cell (step 320 in FIG. 3). Since the ARFCNs are evaluated in descending order based on their RLA_C values, the first suitable cell found is also the most suitable cell. If the current ARFCN is not suitable (i.e., the answer is 'no' for step 740), then the current ARFCN is removed from the PSN list (step 742). If the PSN list is not empty (as determined in step 744), then the terminal returns to step 720 to select another ARFCN to attempt acquisition. Otherwise, if acquisition has been attempted on all ARFCNs in the PSN list without finding a suitable cell, then the terminal performs cell selection (step 310 in FIG. 3).

The cell selection process shown in FIG. 4 and the power scan cell reselection process shown in FIG. 7 each serially decode the BCCH for one cell at a time to determine whether or not that cell is suitable. For example, the BCCH for a cell may be decoded to obtain SI3/SI4 and, if decoding is successful, further decoded to obtain full system information. If either the initial SI3/SI4 or full system information decoding fails, then the next cell is processed. Each of these two processes only decodes the BCCH of another cell if it is determined that the current cell is not suitable. The serial decoding of the BCCHs for multiple cells may substantially lengthen the cell selection and cell reselection processes.

Parallel decoding of the BCCHs for multiple cells may be performed to shorten the cell reselection process. Parallel decoding is possible since the cells broadcast their system information in bursts, as shown in FIG. 2.

Figure 8:
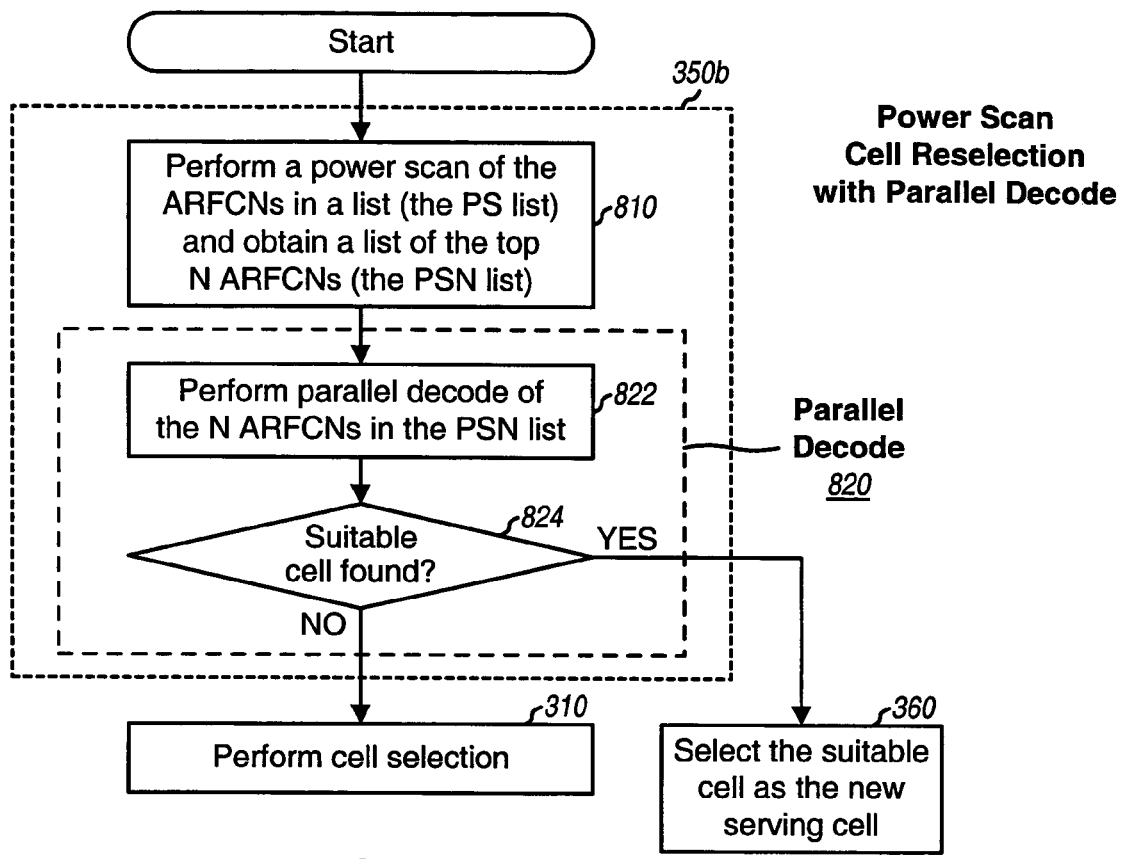
FIG. 8 shows a power scan cell reselection process with parallel decoding.

FIG. 8 shows a flow diagram of a power scan cell reselection process 350b with parallel decoding. Process 350b may also be used for block 350 in FIG. 3. Initially, the terminal performs a power scan of the ARFCNs in the PS list and obtains the PSN list with the N strongest ARFCNs (step 810). Step 810 may be implemented with block 710 in FIG. 7. The terminal then performs parallel decode of the N ARFCNs in the PSN list, as described below (block 820). If a suitable cell is found by the parallel decode (as determined in step 824), then the terminal selects this suitable cell as the serving cell (step 360 in FIG. 3) and thereafter camps on this cell (step 320 in FIG. 3). Otherwise, if no suitable cell was found among all of the ARFCNs in the PSN list, then the terminal performs cell selection (step 310 in FIG. 3).

Parallel decoding may be performed in various manners. In an embodiment, the terminal processes the FCCH and SCH of each of the ARFCNs to be parallel decoded, one ARFCN at a time and in sequential order starting with the strongest ARFCN. The terminal schedules the decoding of the BCCH for each ARFCN for which the FCCH and SCH are successfully acquired. As noted above, the cells in the network are asynchronous and each cell broadcasts system information messages based on a particular schedule. The BCCH decoding for each ARFCN is thus scheduled for the time during which the BCCH is broadcast for that ARFCN. The terminal may process the FCCH and SCH and schedule the BCCH decoding for an ARFCN whenever it is not decoding the BCCH of another ARFCN that has been previously scheduled.

Figure 9:
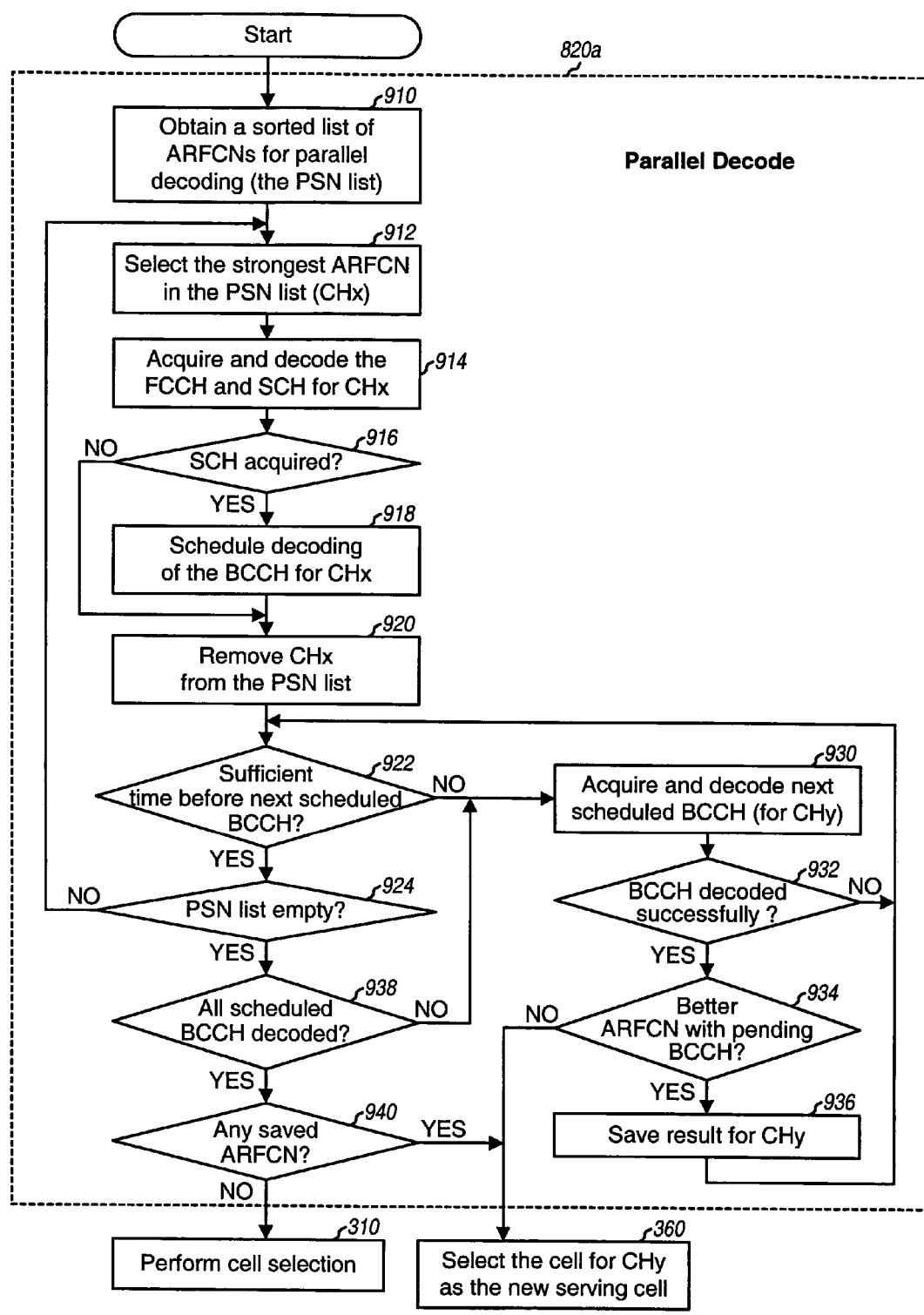
FIG. 9 shows a parallel decoding process.

FIG. 9 shows a flow diagram of a parallel decoding process 820a, which may be used for block 820 in FIG. 8. Initially, the terminal obtains a list of ARFCNs for parallel decoding, which are sorted by their RLA_C values (step 910). This sorted list may be the PSN list provided by the power scan.

The terminal selects the strongest ARFCN in the PSN list, which is denoted as CHx (step 912). The terminal acquires the FCCH for CHx to obtain frequency and coarse timing and then decodes the SCH for CHx to obtain information needed to acquire the BCCH (step 914). If the SCH for CHx was successfully decoded (as determined in step 916), then the terminal schedules the decoding of the BCCH for CHx at the earliest time that the BCCH will be broadcast on CHx (step 918). The terminal removes CHx from the PSN list (step 920) after scheduling the BCCH decoding for CHx in step 918 or if the SCH for CHx cannot be successfully decoded as determined in step 916.

A determination is then made whether or not there is sufficient time before the next scheduled BCCH to process the FCCH and SCH for another ARFCN in the PSN list (step 922). As shown in FIG. 2, the FCCH and SCH are broadcast more frequently than the BCCH. Thus, the FCCH and SCH for multiple ARFCNs may be processed between BCCH transmissions. If the answer is 'no' for step 922, then the terminal proceeds to step 930. Otherwise, if there is sufficient time to process the FCCH and SCH for another ARFCN, then a determination is made whether or not the PSN list is empty (step 924). If the answer is 'no' for step 924, then the terminal returns to step 912 and selects the strongest ARFCN in the PSN list for processing. Otherwise, if the PSN list is empty, then the terminal proceeds to step 938.

In step 930, the terminal acquires and decodes the next BCCH that has been scheduled, which is for an ARFCN denoted as CHy, and obtains SI3 or SI4 for CHy. A determination is then made whether or not the BCCH for CHy was decoded successfully (step 932). If the answer is 'no', then the terminal proceeds to step 922. Otherwise, a determination is next made whether or not there is a better ARFCN (i.e., better than CHy) with a scheduled BCCH that is still pending (step 934). Although the ARFCNs in the PSN list are processed and scheduled in sequential order starting with the best ARFCN, it is possible for the BCCH decoding for a better ARFCN to be scheduled later because of the asynchronous timing of the cells and the different BCCH broadcast schedules used by the cells. If CHy is better than all of the ARFCNs with pending scheduled BCCHs, then the terminal selects the cell for CHy as the serving cell (step 360 in FIG. 3) and thereafter camps on this cell (step 320 in FIG. 3). Otherwise, if there is a better ARFCN with a pending scheduled BCCH, then the terminal saves the result for CHy if CHy is the best ARFCN that has been successfully decoded thus far (step 936). The terminal then proceeds to step 922.

In step 938, a determination is made whether or not all scheduled BCCHs have been decoded. If the answer is 'no', then the terminal returns to step 930 to decode the next BCCH that has been scheduled. Otherwise, if all scheduled BCCHs have been decoded (i.e., the answer is 'yes' for step 938), then a determination is made whether or not there is an ARFCN has been saved previously (step 940). If the answer is 'yes', then the terminal selects the cell for this saved ARFCN as the serving cell (step 360 in FIG. 3) and thereafter camps on this cell (step 320 in FIG. 3). Otherwise, the terminal performs cell selection (step 310 in FIG. 3).

In FIG. 9, steps 910 though 924 process the ARFCNs in the PSN list and schedule the decoding of the BCCHs for these ARFCNs. Steps 930 through 940 decode the scheduled BCCHs and provide the best ARFCN that is successfully decoded.

Figure 10:
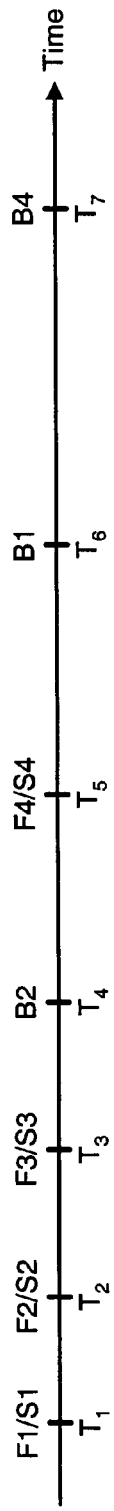
FIG. 10 shows parallel decoding of an exemplary list of four RF channels.

FIG. 10 shows a timeline for the parallel decoding of an exemplary list of four ARFCNs. These ARFCNs are denoted as CH1, CH2, CH3 and CH4, with CH1 being the best ARFCN and CH4 being the worst ARFCN among the four ARFCNs. At time $T_1$, the terminal processes and successfully decodes the FCCH and SCH for CH1 (denoted as F1/S1). The terminal then schedules the decoding of the BCCH for CH1 (denoted as B1) at time $T_6$, which is the earliest time that B1 will be received for CH1. At time $T_2$, the terminal processes and successfully decodes the FCCH and SCH for CH2 (denoted as F2/S2) and schedules the decoding of the BCCH for CH2 (denoted as B2) at time $T_4$. Even though CH2 is processed later than CH1, the decoding of B2 is scheduled earlier than the decoding of B1 because B2 arrives earlier than B1 and there is sufficient time to complete the decoding of B2 before B1 arrives.

At time $T_3$, the terminal processes and unsuccessfully decodes the FCCH and SCH for CH3 (denoted as F3/S3). Therefore, the terminal does not schedule the decoding of the BCCH for CH3. After processing CH3, the terminal determines that there is insufficient time to process CH4 before the scheduled B2 for CH2. The terminal then waits for and decodes B2 at time $T_4$. In this example, even if B2 is successfully decoded, the terminal does not immediately select the cell for CH2 as the new serving cell because there is a better ARFCN (CH1) with a pending scheduled BCCH.

In one embodiment, the terminal stops the scheduling of other ARFCNs once the BCCH of one ARFCN has been successfully decoded. For this embodiment, the terminal would not process and schedule CH4 and simply waits for B1 for CH1. In another embodiment, the terminal continues to process and schedule other ARFCNs even if the BCCH of an ARFCN has been successfully decoded. For this embodiment, the terminal would process and decode the FCCH and SCH for CH4 (denoted as F4/S4) at time $T_5$ and, if the F4/S4 decoding is successful, schedule the decoding of the BCCH for CH4 (denoted as B4) at time $T_7$.

In any case, at time $T_6$, the terminal successfully decodes B1 for CH1. Since there are no other ARFCNs with pending scheduled BCCHs that are better than CH1, the terminal terminates the cell reselection, selects the cell for CH1 as the new serving cell, and camps on this cell.

The parallel decoding may be used for power scan cell reselection, as described above. The parallel decoding may also be used for cell selection, C2-based cell reselection, and non-C2 based cell reselection.

For the embodiment shown in FIG. 3, power scan cell reselection is performed if the C2-based cell reselection or the non-C2 based cell reselection fails. Power scan cell reselection may also be performed at other times, and this is within the scope of the invention. For example, power scan cell reselection may be performed if cell reselection is required and one or more other criteria are satisfied. The criteria may be an insufficient number of valid RLA_C values being available, the valid RLA_C values being lower than a threshold value, no system information is available for any of the neighbors, and so on. Thus, power scan cell reselection may be incorporated in the overall operational process of the terminal in other manners than that shown in FIG. 3, and this is within the scope of the invention.

GSM requires the terminal to perform cell selection if a suitable cell is not found within 10 seconds of initiating cell reselection. To meet this requirement, a timer may be initialized to an appropriate value upon starting cell reselection. When the timer expires, the terminal can abort cell reselection and start cell selection. Early termination of cell reselection by the timer is not shown in FIGS. 5 through 9 for simplicity.

Figure 11:
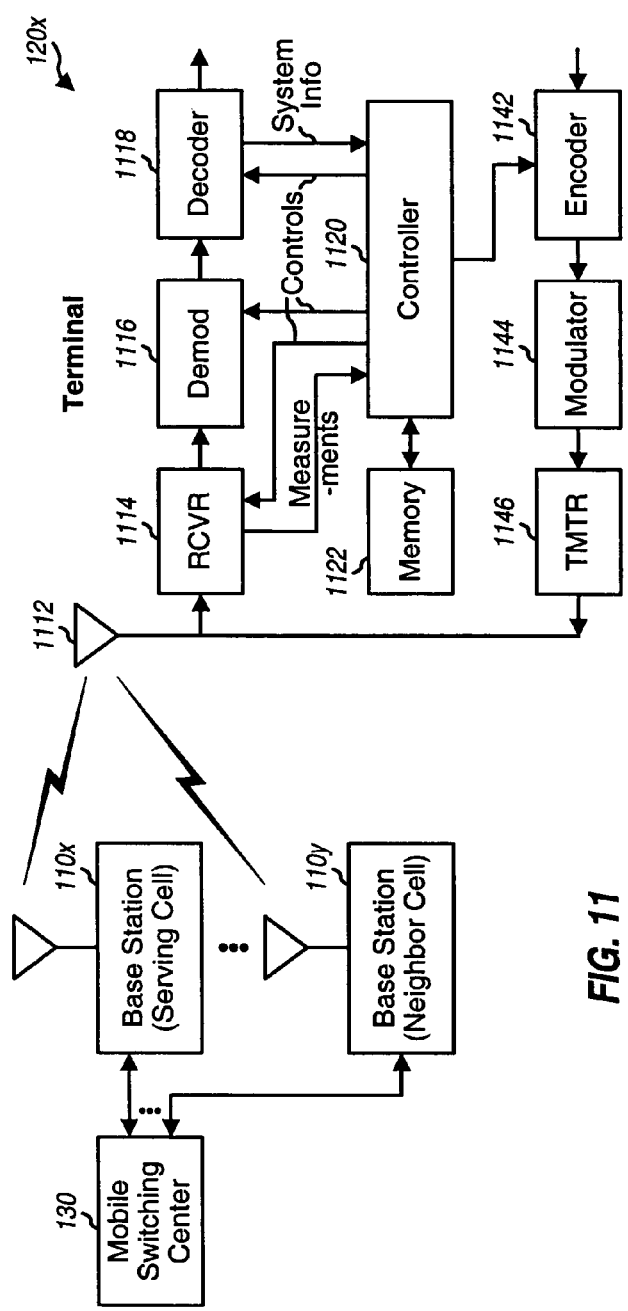
FIG. 11 shows a block diagram of a terminal.

FIG. 11 shows a block diagram of a terminal 120x capable of performing the power scan cell reselection techniques described herein. Terminal 120x is one of the terminals in FIG. 1. Base station 110x is for the current serving cell and base station 110y is for another cell (e.g., a neighbor cell). Base stations 110x and 110y are two of the base stations in FIG. 1 and may belong in the same or different location areas.

On the downlink, terminal 120x receives downlink signals transmitted from various base stations in the system such as base station 110x and/or base station 110y. The received signal at an antenna 1112 is provided to a receiver unit (RCVR) 1114 and conditioned and digitized to obtain data samples. A demodulator (Demod) 1116 then demodulates the data samples in accordance with GSM to obtain demodulated data. A decoder 1118 further decodes the demodulated data in accordance with GSM to obtain decoded data, which may include system information and/or other signaling (e.g., paging messages) transmitted by base station 110x and/or base station 110y. The system information and/or signaling may be provided to a controller 1120 and/or a memory unit 1122.

On the uplink, terminal 120x may transmit data and messages to base station 110x and/or base station 110y. The data/messages may be for registering with a new cell in a new location area, answering a page, and so on. An encoder 1142 receives, formats, and encodes the data/messages. The coded data/messages are then modulated by a modulator 1144 and further conditioned by a transmitter unit (TMTR) 1146 to obtain an uplink signal, which is transmitted to base station 110x and/or base station 110y. Each base station receives and processes the uplink signal to recover the data/messages sent by the terminal, and may forward the messages to mobile switching center 130 for further processing.

Controller 1120 directs the operation of various processing units within terminal 120x. For example, controller 1120 may initiate, direct, and/or perform the processing for idle mode tasks, cell selection, cell reselection, and so on. Memory unit 1122 provides storage for program codes and data used by controller 1120.

Controller 1120 may implement the processes for cell selection and cell reselection described above in FIGS. 3 through 9. For cell selection and cell reselection, controller 1120 directs receiver unit 1114 to make received signal strength measurements for ARFCNs of interest. These measurements may be made as part of idle mode tasks or for a power scan for cell selection or cell reselection. For a power scan, controller 1120 may form a list of ARFCNs for which to obtain measurements, direct receiver unit 1114 to make measurements for these ARFCNs, receive the measurements from receiver unit 1114, compute RLA_C values based on the measurements, sort the results, and provide a list of the top L or N ARFCNs.

Controller 1120 may also determine whether cell reselection is required due to any of the events specified by GSM and may determine whether cell selection is required due to cell reselection failure. For cell selection and cell reselection, control unit 1120 directs demodulator 1116 and decoder 1118 to gather system information for the ARFCNs being evaluated, receives system information from decoder 1118 for these ARFCNs, and uses the information for cell selection and cell reselection.

For clarity, the techniques for performing cell reselection with power scan and/or parallel decode have been described specifically for GSM. These techniques may also be used for other wireless communication systems such as, for example, CDMA systems.

The techniques described herein may be implemented by various means. For example, these techniques may be implemented in hardware, software, or a combination thereof. For a hardware implementation, the elements used for cell reselection with power scan and/or parallel decode may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein (e.g., the processes shown in FIGS. 3 through 9) may be implemented with modules (e.g., procedures, functions, and so on) that perform the functions described herein. The software codes may be stored in a memory unit (e.g., memory unit 1122 in FIG. 11) and executed by a processor (e.g., controller 1120). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device in a communication system, comprising:
   a receiver unit operative to scan a list of radio frequency channels to find a current cell to receive communication service, and from the list of radio frequency channels identify a first list of radio frequency channels for switching from the current cell to a new serving cell; and
   a controller operative to obtain a second list of radio frequency channels from the first list to initiate selection of the new serving cell, wherein if the number of radio frequency channels in the second list exceeds one, the radio frequency channels in the second list are processed in parallel such that the controller directs the receiver unit to acquire each of the frequency channels in the second list for decoding at a scheduled time for determining as a candidate for the channel of the new serving cell.

2. The device of claim 1, wherein the controller is operative to identify a cell that is better than the current serving cell and to initiate cell reselection to the better cell, and wherein a partial power scan on the first list of RF channels and the processing of the at least one radio frequency channel in the second list are performed only if the cell reselection to the better cell fails.

3. The device of claim 1, wherein the controller is operative to determine that service can no longer be received from the current serving cell, to obtain a list of candidate cells from which service may be obtained, and to initiate cell reselection for the candidate cells, and wherein a partial power scan on the first list of radio frequency channels and the processing of the at least one radio frequency channel in the second list are performed only if the cell reselection to the candidate cells fails.

4. The device of claim 1, wherein the controller is further operative to terminate processing of the radio frequency channels in the second list upon finding the suitable cell.

5. The device of claim 1, wherein the communication system is a Global System for Mobile Communications (GSM) system.

6. A method in a communication system, comprising:
scanning an initial list of radio frequency channels to find a current cell to receive communication service;
identifying a first list of radio frequency channels from the initial list of radio frequency channels for switching from the current cell to a new serving cell;
providing a second list of radio frequency channels from the first list to initiate selection of the new serving cell; and
processing the radio frequency channels in the second list in parallel if the number of radio frequency channels in the second list exceeds one, via acquiring each of the frequency channels in the second list for decoding at a scheduled time for determining as a candidate for the channel of the new serving cell.

7. The method of claim 6 further including performing a partial scan on the first list of radio frequency channels to provide the second list of radio frequency channels via first obtaining from each of the initial list of radio frequency channels a sufficient number of received signal strength measurements and further computing an average of the received signal strength measurements.

8. The method of claim 6, further comprising:
identifying a cell that is better than the current serving cell;
performing cell reselection to the better cell; and
performing the obtaining the first list, performing a partial power scan, obtaining the second list, processing, and selecting if the cell reselection to the better cell fails.

9. The method of claim 6 further comprising:
determining that if service can no longer be received from the current serving cell;
obtaining a list of candidate cells from which service may be obtained;
performing cell reselection for the candidate cells; and
performing the obtaining the first list, performing a partial power scan, obtaining the second list, processing, and selecting if the cell reselection to the candidate cells fails.

10. The method of claim 6, wherein the second list includes all of the radio frequency channels in the first list.

11. The method of claim 6 further including terminating the acquiring, scheduling, and decoding upon finding the suitable cell.

12. The method of claim 11 further including terminating the acquiring, scheduling, and decoding upon finding a most suitable cell with strongest received signal strength measurement among all suitable cells for the radio frequency channel of the second list.

13. The method of claim 6 further comprising, if a suitable cell is not found, performing cell selection for all the radio frequency channels of the initial list to be evaluated for cell selection.

14. The method of claim 6 wherein the communication system is a Global System for Mobile Communications (GSM) system.

15. The method of claim 6 further including for each of the radio frequency channels in the second list:
acquiring a synchronization channel (SCH);
scheduling decoding of a broadcast control channel (BCCH); and
decoding the BCCH at the scheduled time as the candidate for the channel of the new serving cell.

16. A device in a communication system, comprising:
means for scanning an initial list of radio frequency channels to find a current cell to receive communication service;
means for identifying a first list of radio frequency channels from the initial list of radio frequency channels for switching from the current cell to a new serving cell;
means for providing a second list of radio frequency channels from the first list to initiate selection of the new serving cell; and
means for parallel processing the radio frequency channels in the second list if the number of radio frequency channels in the second list exceeds one, via acquiring each of the frequency channels in the second list for decoding at a scheduled time for determining as a candidate for the channel of the new serving cell.

17. The device of claim 16 further including means for performing a partial scan on the first list of radio frequency channels to provide the second list of radio frequency channels via first obtaining from each of the initial list of radio frequency channels a sufficient number of received signal strength measurements and further computing an average of the received signal strength measurements.

18. The device of claim 16 further comprising:
means for identifying a cell that is better than the current serving cell;
means for performing cell reselection to the better cell; and
means for performing the obtaining the first list, performing a partial power scan, obtaining the second list, processing, and selecting if the cell reselection to the better cell fails.

19. The device of claim 16, further comprising:
means for determining that service can no longer be received from the current serving cell;
means for obtaining a list of candidate cells from which service may be obtained;
means for performing cell reselection for the candidate cells; and
means for performing the obtaining the first list, performing a partial power scan, obtaining the second list, processing, and selecting if the cell reselection to the candidate cells fails.

20. The device of claim 16, wherein the second list includes all of the radio frequency channels in the first list.

21. The device of claim 16 further means for including terminating the acquiring, scheduling, and decoding upon finding the suitable cell.

22. The device of claim 21 further including means for terminating the acquiring, scheduling, and decoding upon finding a most suitable cell with strongest received signal strength measurement among all suitable cells for the radio frequency channel of the second list.

23. The device of claim 16 further comprising, if a suitable cell is not found, means for performing cell selection for all the radio frequency channels of the initial list to be evaluated for cell selection.

24. The device of claim 16 wherein the communication system is a Global System for Mobile Communications (GSM) system.

25. The device of claim 16 further including for each of the radio frequency channels in the second list:
 means for acquiring a synchronization channel (SCH);
 means for scheduling decoding of a broadcast control channel (BCCH); and
 means for decoding the BCCH at the scheduled time as the candidate for the channel of the new serving cell.

26. A computer program product including a computer-readable medium having computer-readable code for:
 scanning an initial list of radio frequency channels to find a current cell to receive communication service;
 identifying a first list of radio frequency channels from the initial list of radio frequency channels for switching from the current cell to a new serving cell;
 providing a second list of radio frequency channels from the first list to initiate selection of the new serving cell; and
 processing the radio frequency channels in the second list in parallel if the number of radio frequency channels in the second list exceeds one, via acquiring each of the frequency channels in the second list for decoding at a scheduled time for determining as a candidate for the channel of the new serving cell.

27. The computer program product of claim 26 further including computer-readable code for performing a partial scan on the first list of radio frequency channels to provide the second list of radio frequency channels via first obtaining from each of the initial list of radio frequency channels a sufficient number of received signal strength measurements and further computing an average of the received signal strength measurements.

28. The computer program product of claim 26 further including computer-readable code for terminating the acquiring, scheduling, and decoding upon finding the suitable cell.

29. The computer program product of claim 26 wherein the communication system is a Global System for Mobile Communications (GSM) system.

30. The computer program product of claim 26 further computer-readable code for each of the radio frequency channels in the second list for:
 acquiring a synchronization channel (SCH);
 scheduling decoding of a broadcast control channel (BCCH); and
 decoding the BCCH at the scheduled time as the candidate for the channel of the new serving cell.

* * * * *